United States Patent

Deutscher et al.

[15] 3,663,902

[45] May 16, 1972

[54] METHOD FOR MODIFYING THE CHARACTERISTICS OF A MICROWAVE AND DEVICE FOR THE APPLICATION OF SAID METHOD

[72] Inventors: Guy Deutscher, 6, Square Charles Laurent, Paris 15e; Georges Waysand, 172, Rue R. Losserand, Paris XIV, both of France

[22] Filed: Feb. 22, 1971

[21] Appl. No.: 117,463

[30] Foreign Application Priority Data

Feb. 27, 1970 France ..................................7007133

[52] U.S. Cl. ...........................333/99 S, 333/83 R, 333/31 R

[51] Int. Cl. ....................H01v 11/12, H01p 7/06, H01p 9/00

[58] Field of Search .................333/99 S; 307/306; 338/32 S; 174/DIG. 006

[56] References Cited

UNITED STATES PATENTS 3,191,055 6/1965 Swihart et al. ........................338/32 S
3,548,073 12/1970 Nishino.........................174/DIG. 006
3,548,078 12/1970 Albrecht.......................174/DIG. 006
3,163,832 12/1964 Nahman et al................174/DIG. 006
2,914,736 11/1959 Young.................................333/99 S

OTHER PUBLICATIONS

Lentz: Transmission Line M Derived Section, IBM Technical Disclosure Bulletin, Vol. 5, No. 2, p. 21, July 1962

Tansal & Sobol: Cryogenic Detector, IBM Technical Disclosure Bulletin, Vol. 5, No. 4, p. 23, Sept. 1962

Scott: Variable Resistance, IBM Technical Disclosure Bulletin, Vol. 4, No. 9, p. 10, Feb. 1962

Meissner: Range of Order of Superconducting Electrons, Physical Review Letters, Vol. 2, No. 11, pp. 458, 459, June 1, 1959

Meissner: Superconductivity of Contacts with Interposed Barriers, Physical Review, Vol. 117, No. 3, pp. 672- 680, Feb. 1, 1960

*Primary Examiner*—Herman Karl Saalbach
*Attorney*—Cameron, Kerkam & Sutton

[57] ABSTRACT

In a microwave structure, a magnetic field is applied in a direction parallel to one or more elements consisting of two superposed metallic layers which are in good electrical contact and one of which is superconducting. The magnetic field intensity is varied in order to modify the thickness of the zone of superconductivity which is induced in the non-superconducting metallic film-layer and consequently in order to modify the depth of penetration of the microwave in the element.

10 Claims, 5 Drawing Figures

METHOD FOR MODIFYING THE CHARACTERISTICS OF A MICROWAVE AND DEVICE FOR THE APPLICATION OF SAID METHOD

This invention relates to a method for modifying the characteristics of a microwave, namely to a method for varying the characteristics such as the intensity, the frequency and the phase of a microwave. A miniaturized device for microwaves is also provided in accordance with the invention in order to carry out said method, is of very small size and permits of many alternative designs. For example, the device can be a variable or non-variable attenuator, a tunable or non-tunable filter, a cavity resonator, a delay line having a readily controllable time-delay, a modulator and so forth.

Modification of the characteristics of a microwave which propagates within a device is usually obtained by varying either the dimensions or the electrical properties of the device.

Thus, in the case of a cavity resonator, for example, the frequency of a microwave which is injected into the cavity varies when the dimensions of this latter are modified by displacing a wall, for example. The field intensity of said microwave can also be changed by inserting an absorbent dielectric substance in the cavity to a variable distance within this latter, with the result that the configuration of the lines of magnetic and electric force within the cavity is disturbed to a greater or lesser degree. Similarly, variable diaphragms are commonly employed for the purpose of shutting-off to the required extent the coupling hole of the resonant cavity through which the microwaves are injected.

The field intensity of a microwave can also be modified by placing on its path a reactive element such as a semiconductor diode which is biased either in the forward or reverse direction, variations in intensity being brought about as a result of disturbance of the lines of electric and magnetic force which are associated with the microwave. All these methods entail the use either of a passive element (such as a dielectric, for example) or an active element (a semiconductor diode) whilst mechanical means serve to modify the dimensions of a resonant cavity or a waveguide or alternatively to shut-off the coupling hole to a greater or lesser extent. Such designs give rise to major difficulties when it is desired to construct miniaturized microwave circuits.

The invention provides a method and a device which meet practical requirements more effectively than those of the prior art, especially by virtue of the fact that this method makes it possible to vary the characteristics of a microwave without resorting to the use of mechanical means, that many alternative designs may be contemplated in the construction of the device which can on the one hand be readily integrated with miniaturized circuits and on the other hand be very readily controlled in a progressive manner.

With this objective, the invention proposes a method for modifying the characteristics of a microwave which propagates within a structure composed of at least one element comprising two superposed metallic film-layers which are in good electrical contact over their entire common surface and one of which is superconducting. The method is characterized in that a magnetic field is applied to said element, the direction of said magnetic field being substantially parallel to said element and that the intensity of said magnetic field is varied in order to modify the thickness of the zone of superconductivity which is induced in said non-superconducting metallic film-layer and consequently in order to modify the depth of penetration of the microwave in said element.

The invention also proposes a miniaturized device for microwaves which is intended to carry out said method and essentially comprises at least one element formed of two superposed metallic film-layers which are in good electrical contact over their entire common surface and one of which is superconducting, and means for producing a magnetic field in a direction substantially parallel to said film-layers.

A clearer understanding will be gained from the description which now follows below and relates to modes of execution of the invention which are given by way of example but without any intended limitation, reference being made to the accompanying drawings, in which.

Figure 1:
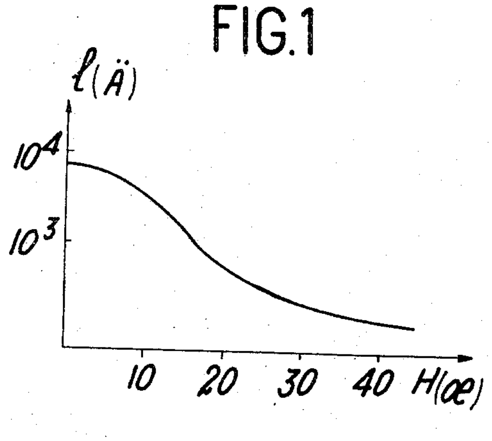
FIG. 1 shows the variation in thickness of the zone of superconductivity which is induced in a zinc layer associated with a layer of an indium-bismuth alloy as a function of the intensity of the magnetic field H.

The invention makes use of the so-called "proximity effect." This is a physical effect produced by two juxtaposed metals which are in good electrical contact with each other and have a mutual influence on their superconducting properties, one of the metals being superconducting even if it is considered separately. From a microscopic standpoint, superconductivity arises from the presence of superconducting electrons. The fact of placing a normal metal N in adjacent relation to a superconducting metal S at a predetermined temperature permits the possibility of diffusion of the superconducting electrons of the metal S within the metal N. It is then observed that superconducting properties appear in the metal N and that a zone of induced superconductivity having a thickness $l$ is created. This zone is located within the metal N which is directly in contact with the surface of the superconducting metal S. The thickness $l$ of the induced superconductivity zone is highly dependent on the intensity of the magnetic field H which is applied parallel to the N-S junction. This variation is represented in FIG. 1 in which $l$ is expressed in Angstroms and H is expressed in oersteds. It is noted that the values of H are substantially lower than those of the critical field of the superconductor which causes this latter to change to the normal state. The thickness $l$ depends on the materials which are chosen for the purpose of forming the N-S junction, on the value of intensity of the magnetic field which is applied and on the choice of the operating temperature of the element N-S. Depending on the pairs of materials which are selected, the thickness $l$ can be of the order of several thousand Angstroms.

The method according to the present invention utilizes two properties of the superconductivity which is induced in the normal metal N: on the one hand the reduction in electric resistance of the metal N and on the other hand the Meissner effect, that is to say the expulsion of any magnetic field from a superconducting region. These two properties modify the skin thickness of the normal metal and therefore the penetration of a microwave in contact with the metal N of an N-S element.

Figure 2:
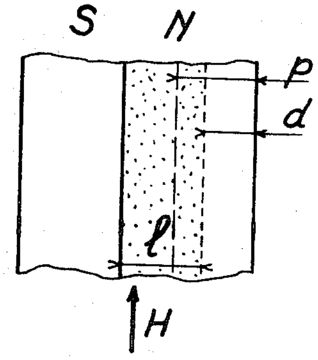
FIG. 2 illustrates the method according to the invention.

In FIG. 2 which illustrates the method, there is shown an N-S element. When a microwave is in contact with the metal N of an N-S element, said wave penetrates into the metal N to a penetration depth $p$ which depends (in the case of a given element) on the value of the intensity of the magnetic field H which is applied parallel to the junction of the N-S element. When the intensity of said magnetic field is sufficiently high, the superconductivity which is induced in N is practically destroyed. The penetration of the microwave in N then corresponds to the value $p$ of the normal skin effect. This value is given by the relation:

$$p=\left(\frac{1}{\pi\epsilon\mu f}\right)^{1/2} \qquad (1)$$

in which $f$ is the frequency of the microwave, $\mu$ and $\epsilon$ represent respectively the permittivity and the conductivity of the metal N. It is observed that the value $p$ of the skin effect is related to the microwave frequency $f$.

When the intensity of the magnetic field H is reduced, the thickness $l$ of the induced superconductivity zone increases. The maximum value of $l$ is obtained when the action of H is eliminated. Since the magnetic flux is totally expelled from a superconductivity zone (Meissner effect), the depth of penetration of the microwave is reduced to a value which is equal to $d$. The variation in intensity of the magnetic field H therefore provides a very convenient method for varying the skin thickness of the metal N. The variation in depth of the penetration of the microwave results in modification of the surface impedance of the metal N and therefore on the one hand in more or less substantial microwave losses in N and on the other hand in a modification of the response either in phase or in frequency, depending on the structure in which the N-S element is incorporated.

Figure 3:
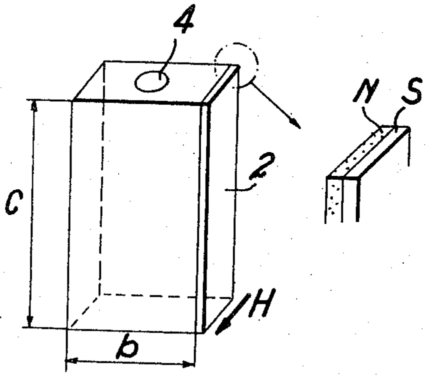
FIG. 3 illustrates a resonant cavity for microwaves in accordance with the invention.

In FIG. 3, which represents a resonant cavity for microwaves in accordance with the invention, the wall 2 of said cavity is constituted by an N-S element, the non-superconducting metal N being located within the interior of the cavity. The microwaves are injected through the coupling hole 4. When the intensity of the magnetic field H which is applied parallel to the wall 2 in the direction indicated by the arrow of FIG. 3 is of sufficiently high value, the superconductivity induced in N as a result of the proximity of S is practically destroyed. When the intensity of H is reduced, the thickness $l$ of the induced superconductivity zone increases and the depth of penetration of the microwave into the metal N of the wall 2 decreases. Thus, by varying the intensity of H, the electrical dimension $b$ of the cavity can be modified (as shown in FIG. 2) to an extent equal to the distance $(p-d)$. The wavelength of a microwave at resonance within the cavity in the $TE_{011}$ mode is given by the relation :

$$\lambda=2\left(\frac{1}{b^2}+\frac{1}{c^2}\right)^{-1/2} \quad (2)$$

wherein $b$ and $c$ represent the dimensions of the cavity as indicated in FIG. 3.

Inasmuch as the depth of penetration is substantially smaller than the dimension $b$, the modification of the dimension $b$ can be assimilated with a slight increase $(p-d)$. The variation $\Delta\lambda$ in the wavelength as well as the variation $\Delta f$ in the resonant frequency obtained by deriving the relation (2) can accordingly be expressed by the relation :

$$\frac{\Delta\lambda}{\lambda}=\frac{\Delta f}{f}=\frac{\lambda^2(p-d)}{4b^3} \quad (3)$$

In the case of a cavity having a resonant frequency in the vicinity of $10^{10}$ cps ($f=10^{10}$), relation (3) results in a relative frequency variation $\Delta f/f$ which is equal to $10^{-5}$. There is thus obtained a non-mechanical device which permits of frequency scanning with losses which are not higher than those of a wall of normal metal at the same temperature. Moreover, the proximity effect permits of progressive control. Frequency-control of the cavity can therefore be contemplated, the electric current which produces the magnetic field H being regulated in dependence on any signal which results from variations in the characteristics of the microwave.

The resonant cavity which is illustrated in FIG. 3 can also be employed for the purpose of attenuating the intensity of a microwave having a stable frequency (which is stabilized by means of a klystron, for example). In fact, since the value of the resonant frequency is determined by the dimensions of the cavity (relation 2), the variation of the dimension $b$ which is produced by modifying the intensity of the magnetic field H shifts the resonant frequency of the cavity. If the frequency of the microwave which is injected through the coupling hole 4 is maintained constant, the intensity of the microwave decreases to a greater or lesser extent according as the resonant frequency of the cavity differs from the frequency of the injected wave to a greater or lesser extent.

Moreover, the variation in thickness of the induced superconductivity zone results in a modification of the electric resistance of the metal N with respect to the microwave and consequently in a variation of the wave losses in N, the amplitude of which depends on the pair of metals selected.

Figure 4:
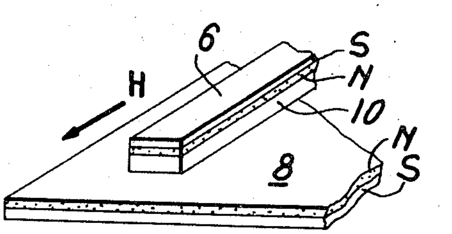
FIG. 4 illustrates a transmission line of small thickness in accordance with the invention, this transmission line being suitable for use either as an attenuator or as a filter, for example.

In FIG. 4, there is shown a transmission line of small thickness in accordance with the invention, this type of line being often referred-to as a microwave stripline or "microstrip." The line mainly consists of two N-S elements 6 and 8 separated by a dielectric 10, the non-superconducting metals N being in contact with the dielectric 10. Means which are not shown in FIG. 4 serve to produce a magnetic field H having a direction parallel to the elements 6 and 8 and in the direction of propagation of the microwaves in the dielectric 10. Said means can consist, for example, of a solenoid which surrounds the transmission line. When a microwave propagates within the dielectric 10, said microwave penetrates into the metals N to a certain depth. This depth depends on the thickness of the zone of superconductivity which is induced in the non-superconducting metals and which in turn varies with the intensity of the magnetic field H. Since the variation of H causes modification of the electrical resistance of the metal N as a result of modification of the skin thickness, the losses undergone by the microwave which propagates within the dielectric 10 can therefore be modified. This transmission line therefore advantageously performs the function of a variable attenuator.

Moreover, the pass-band of a transmission line depends on the skin thickness of the walls which are placed on each side of the dielectric 10. Since said thickness can very readily be modified by induced superconductivity, the frequency pass-band of the transmission line which is illustrated in FIG. 4 can easily be modified or tuned both continuously and progressively, simply by varying the intensity of the magnetic field H. This transmission line can therefore be employed as a frequency filter.

It is quite evident that a transmission line of small thickness in accordance with the invention can be constituted by a single N-S element.

Figure 5:
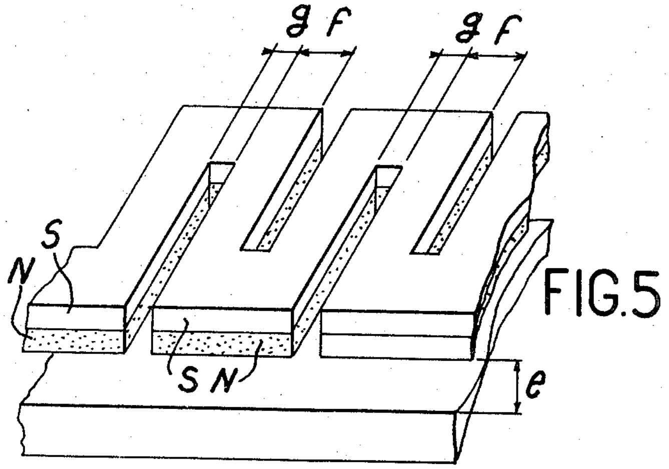
FIG. 5 illustrates a delay line in accordance with the invention.

The device illustrated in FIG. 5 is a superconducting delay line which exhibits the proximity effect. This delay line is formed of a transmission line having a small thickness of dielectric material and having at least one N-S element per wall. Said line can be constructed in accordance with the crenellated configuration which is shown diagrammatically in FIG. 5 in order to increase the amplitude of the time delay in respect of a given overall size. The values of $f$ and $g$ are of the same order of magnitude and much higher than the value of $e$. The time delay, that is to say the displacement between the phase velocity and the wave propagation velocity, results from the inductive component of the surface impedance. The delay is greater as the thickness $e$ of the dielectric of the structure is smaller. In the case of a given structure, the microwave time-delay can be varied very simply by modifying the depth of penetration of said microwave into N by varying the magnetic field H. A very simple means is therefore made available for retarding a microwave at will, with the result that the device shown in FIG. 5 can be employed as a continuously variable delay line.

By way of example, a delay line in accordance with the invention can be formed by means of a solid tantalum substrate on which is placed a film-layer of tantalum oxide having a thickness of a few Angstroms, the film-layer N and the film-layer S being deposited successively on said oxide layer by the vacuum evaporation technique. The layer N can be formed of tin and the layer S of lead ; the N-S element accordingly operates at an approximate temperature of 4.2° K. The intensity of the applied magnetic field is very low and does not exceed a few tens of Gauss.

The advantages of this invention are numerous. In the first place, it now becomes possible to fabricate miniaturized microwave structures which are capable of modifying the characteristics of microwaves by making use of non-mechanical means. The operating frequency band of these structures is extremely wide and can accordingly extend to frequencies of the order of 1 gigacycle up to 100 gigacycles. Large-scale manufacture does not present any difficulty in comparison with the thin-film techniques which are already employed in the electronics industry. Finally, said structures exhibit excellent stability in time.

The device which is illustrated in FIG. 4 can be employed as a microwave modulator, for example, by modulating the magnetic field H. The delay line which is illustrated in FIG. 5 can also have a different shape : it is only important to ensure that this line has a thickness of dielectric which is comparable to the depth of penetration into N.

What we claim is :

1. A method for modifying the characteristics of a microwave which propagates within a structure composed of at least one element comprising two metallic film-layers which are superposed and in good electrical contact over their entire common surface and one of which is superconducting, wherein a magnetic field is applied to said element, the direction of said magnetic field being substantially parallel to said element and wherein the intensity of said magnetic field is varied in order to modify the thickness of the zone of superconductivity which is induced in said non-superconducting metallic film-layer and consequently in order to modify the depth of penetration of the microwave in said element.

2. A miniaturized device for microwaves entailing the application of the method defined in claim 1 and comprising at least one element formed of two superposed metallic film-layers which are in good electrical contact over their entire common surface and one of which is superconducting, and means for producing a magnetic field in a direction substantially parallel to said film-layers.

3. A device according to claim 2, wherein said element is formed by successive deposition of two metallic film-layers on a substrate and one of said layers is superconducting.

4. A device according to claim 3, wherein said deposition is carried out under vacuum by thermal evaporation of the metals which form said film-layers.

5. A device according to claim 2, claim 3 or claim 4 and comprising said two superposed and parallel elements which are separated by dielectric material, the non-superconducting metallic film-layers being in contiguous relation to said dielectric material, said device being suitable for use as an attenuator and as a frequency filter.

6. A device according to claim 5, wherein the losses of said attenuator and the pass-band of said frequency filter are variable as a function of the intensity of said magnetic field.

7. A device according to claim 2, claim 3 or claim 4 as constituted by a resonant cavity for microwaves in which at least one cavity wall is formed by means of said element, said non-superconducting metallic film-layer being located within the interior of said cavity and said direction of said magnetic field being substantially perpendicular to the direction of propagation of said microwaves within said cavity.

8. A device according to claim 7, wherein the losses and frequency of said device are variable as a function of the intensity of said magnetic field.

9. A device according to claim 2, claim 3 or claim 4, wherein said element constitutes a delay line.

10. A device according to claim 9, wherein the time-delay is variable as a function of the intensity of said magnetic field.

* * * * *

PO-1050
(5/69)

UNITED STATES PATENT OFFICE
CERTIFICATE OF CORRECTION

Patent No. 3,663,902 Dated May 16, 1972

Inventor(s) Guy Deutscher and Georges Waysand

It is certified that error appears in the above-identified patent and that said Letters Patent are hereby corrected as shown below:

--[73] Assignee: Agence Nationale De Valorisation De La Recherche (ANVAR)-- is omitted.

Signed and sealed this 26th day of September 1972.

(SEAL)
Attest:

EDWARD M.FLETCHER,JR.
Attesting Officer

ROBERT GOTTSCHALK
Commissioner of Patents